(12) United States Patent
Mukhopadhyay et al.

(10) Patent No.: US 9,473,832 B2
(45) Date of Patent: Oct. 18, 2016

(54) GCC0 TUNNELING OVER AN OTN TRANSPORT NETWORK

(71) Applicants: Maitreya Mukhopadhyay, Allen, TX (US); Albert V. Smith, Jr., Richardson, TX (US); Catherine Yuan, Plano, TX (US)

(72) Inventors: Maitreya Mukhopadhyay, Allen, TX (US); Albert V. Smith, Jr., Richardson, TX (US); Catherine Yuan, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/540,952

(22) Filed: Nov. 13, 2014

(65) Prior Publication Data

US 2016/0142796 A1    May 19, 2016

(51) Int. Cl.
   *H04Q 11/00*    (2006.01)
   *H04J 3/16*     (2006.01)
   *H04L 12/46*    (2006.01)

(52) U.S. Cl.
   CPC ......... *H04Q 11/0003* (2013.01); *H04J 3/1652* (2013.01); *H04L 12/4633* (2013.01); *H04Q 11/0066* (2013.01)

(58) Field of Classification Search
   USPC ................................................... 398/45–58
   See application file for complete search history.

(56) References Cited

U.S. PATENT DOCUMENTS

| | | | | |
|---|---|---|---|---|
| 7,539,196 B2* | 5/2009 | Flavin | ..................... | H04J 3/1611 370/394 |
| 7,610,330 B1* | 10/2009 | Quinn | ..................... | H04L 45/02 709/201 |
| 7,787,448 B2* | 8/2010 | Zhang | ..................... | H04J 3/1652 370/299 |
| 8,417,111 B2* | 4/2013 | Moynihan | .............. | H04J 3/1611 398/1 |
| 8,571,037 B2* | 10/2013 | Aisawa | ................... | H04J 3/076 370/395.51 |
| 8,644,347 B2* | 2/2014 | Loprieno | .................. | H04J 3/07 370/503 |
| 8,665,738 B2* | 3/2014 | Katagiri | .................... | H04J 3/07 360/51 |
| 8,675,684 B2* | 3/2014 | Katagiri | ................. | H04J 3/076 370/465 |
| 8,699,495 B2* | 4/2014 | Lee | ..................... | H04L 12/4633 370/331 |
| 8,811,212 B2* | 8/2014 | Beheshti-Zavareh | ... | H04L 45/64 370/252 |
| 8,948,205 B2* | 2/2015 | Vissers | ........................ | 370/476 |
| 8,958,701 B2* | 2/2015 | Chaudhary | .......... | H04B 10/032 398/1 |
| 8,977,120 B2* | 3/2015 | Ohara | ................... | H04J 3/1658 398/43 |
| 9,020,345 B2* | 4/2015 | Fu | ........................... | H04L 45/10 370/351 |
| 9,025,594 B1* | 5/2015 | Mok | ................... | H04J 14/0201 370/369 |

(Continued)

OTHER PUBLICATIONS

ITU-T, G.709/Y.1331, Interfaces for the optical transport network, 238 pages, Feb. 2012.

(Continued)

*Primary Examiner* — Agustin Bello
(74) *Attorney, Agent, or Firm* — Baker Botts L.L.P.

(57) ABSTRACT

Systems and methods for tunneling GCC0 bytes over an OTN transport network are disclosed. The method includes receiving, at a first network element, a first data frame comprising a set of management bytes and a set of data bytes, determining whether the set of management bytes should be tunneled, and, in response to determining that the management bytes should be tunneled, sending, to a second network element, a second data frame comprising the set of management bytes and the set of data bytes.

20 Claims, 7 Drawing Sheets

(56) References Cited

U.S. PATENT DOCUMENTS

| | | | | |
|---|---|---|---|---|
| 9,210,075 | B2* | 12/2015 | Bhattacharya | H04L 45/50 |
| 9,225,591 | B2* | 12/2015 | Beheshti-Zavareh | H04L 45/64 |
| 2004/0062277 | A1* | 4/2004 | Flavin | H04J 3/1611 |
| | | | | 370/474 |
| 2004/0184450 | A1* | 9/2004 | Omran | H04J 3/1617 |
| | | | | 370/372 |
| 2007/0071443 | A1* | 3/2007 | Fukumitsu | H04J 3/1611 |
| | | | | 398/79 |
| 2007/0091897 | A1* | 4/2007 | Lee | H04L 12/4633 |
| | | | | 370/395.5 |
| 2007/0248121 | A1* | 10/2007 | Zou | H04J 3/1611 |
| | | | | 370/498 |
| 2007/0269218 | A1* | 11/2007 | Zhang | H04J 3/1652 |
| | | | | 398/140 |
| 2013/0004168 | A1* | 1/2013 | Ohara | H04J 3/0638 |
| | | | | 398/43 |
| 2013/0215898 | A1* | 8/2013 | Cao | H04L 49/357 |
| | | | | 370/392 |
| 2014/0186019 | A1* | 7/2014 | Chaudhary | H04B 10/032 |
| | | | | 398/1 |
| 2014/0219098 | A1* | 8/2014 | Lee | H04L 12/4633 |
| | | | | 370/235 |
| 2014/0355991 | A1* | 12/2014 | Cameirao | H04B 10/2575 |
| | | | | 398/79 |
| 2015/0023368 | A1* | 1/2015 | Connolly | H04L 12/6402 |
| | | | | 370/420 |

OTHER PUBLICATIONS

ITU-T, G.7712/Y.1703, Architecture and specification of data communication network; 96 pages, Sep. 2010.

ITU-T, G.7712/Y.1703, Architecture and specification of data communication network—Amendment 1, 12 pages, Oct. 2013.

Fujitsu Network Communications, Inc.; Flashwave® Packet Optical Networking Platform; 10 pages, Mar. 2014.

\* cited by examiner

GCC0 TUNNELING OVER AN OTN TRANSPORT NETWORK

BACKGROUND

1. Field of the Disclosure

The present disclosure relates to communications systems and more specifically to GCC0 tunneling over an OTN transport network.

2. Description of the Related Art

Telecommunications systems, cable television systems, and data communication networks use communication networks to rapidly exchange large amounts of information between remote points. A communication network may include network elements that route digital signals, including digital data packets and data frames, through the network. Some network elements may include a distributed architecture, wherein packet processing may be distributed among several subsystems of the network element (e.g., line cards).

Communications over optical communication lines are often encoded using the Synchronous Digital Hierarchy ("SDH"), Synchronous Optical Networking ("SONET"), or Optical Transport Network ("OTN") standards. In networks using the OTN standard, a network element may send transmission control and other types of signaling information over the General Communication Channel ("GCC"), as defined in the International Telecommunications Union ("ITU") standard G.709 ("ITU-T G.709"). GCC bytes are often used to carry management information for remote management of OTN devices over an OTN network. For example, GCC bytes may be used to implement distributed management communications as defined in ITU standard G.7712 ("ITU-T G.7712"). A particular type of GCC bytes, known as GCC0 bytes, are carried in the overhead of an Optical Channel Transport Unit (OTU), and can carry management information over a single network link or "hop" between network elements.

In some OTN networks, one network operator may provide a connection between two distinct portions of another network operator's network. For example, a provider network may link to different portions of a customer's network. In such networks, the provider may not want to participate in management of the customer's network. In addition, the customer may not want the provider to peer into its management information. Furthermore, in some cases, protocols built on top of GCC0 bytes may differ between the customer network and the provider network. However, because GCC0 bytes are terminated at the end of each network hop, GCC0 bytes are not transparently carried from one portion of the customer's network to the other portion across the provider's network.

SUMMARY

In accordance with some embodiments of the present disclosure, a method includes receiving, at a first network element, a first data frame comprising a set of management bytes and a set of data bytes, determining whether the set of management bytes should be tunneled, and, in response to determining that the management bytes should be tunneled, sending, to a second network element, a second data frame comprising the set of management bytes and the set of data bytes.

In accordance with other embodiments of the present disclosure, a network element includes a processor and a memory communicatively coupled to the processor. The memory includes instructions that, when executed by the processor, cause the processor to receive a first data frame comprising a set of management bytes and a set of data bytes, determine whether the set of management bytes should be tunneled, and in response to determining that the management bytes should be tunneled, send, to a second network element, a second data frame comprising the set of management bytes and the set of data bytes.

In accordance with other embodiments of the present disclosure, a non-transient computer readable medium includes instructions that, when executed by a processor, cause the processor to receive a first data frame comprising a set of management bytes and a set of data bytes, determine whether the set of management bytes should be tunneled, and in response to determining that the management bytes should be tunneled, send, to a second network element, a second data frame comprising the set of management bytes and the set of data bytes.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
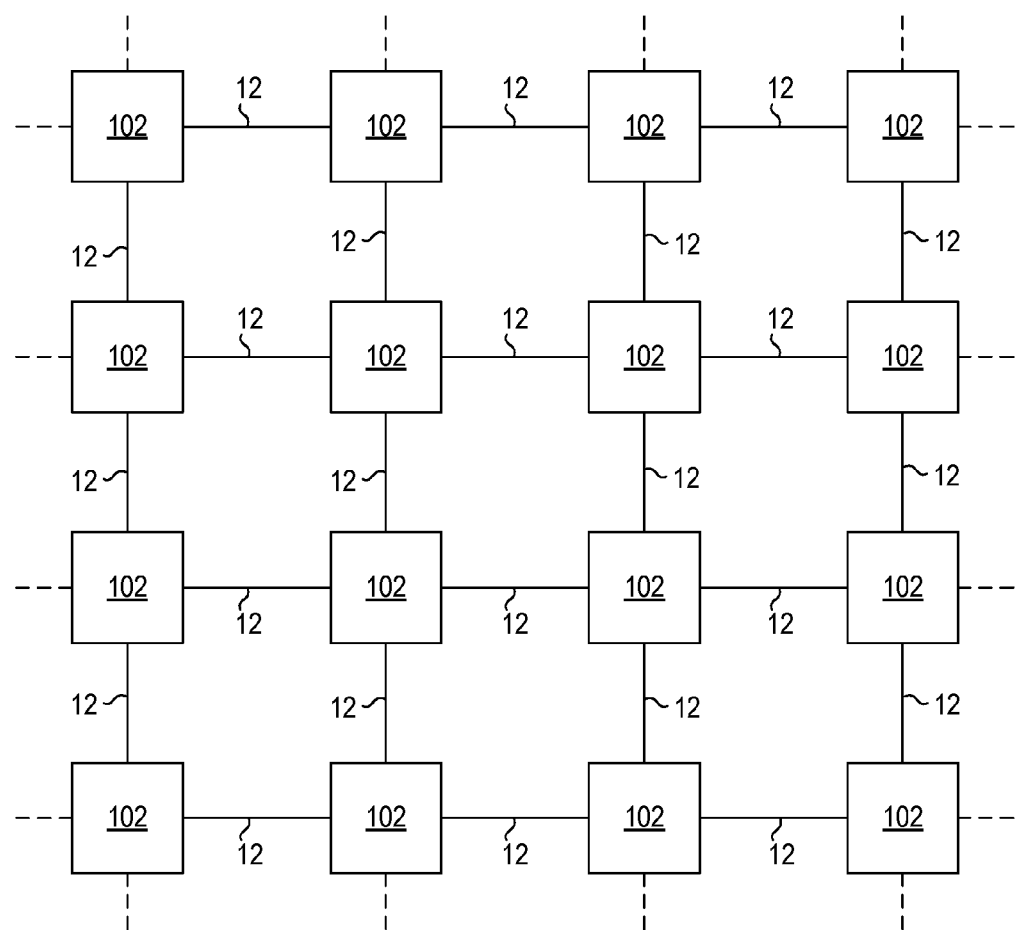
FIG. 1 illustrates a block diagram of selected elements of an example network, in accordance with some embodiments of the present disclosure.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget 12-1 refers to an instance of a widget class, which may be referred to collectively as widgets 12 and any one of which may be referred to generically as a widget 12.

Turning now to the drawings, FIG. 1 illustrates a block diagram of selected elements of example network 100, in accordance with some embodiments of the present disclosure. In certain embodiments, network 100 may be an SDH/SONET network, an OTN network, a T-carrier network, an Ethernet network, a wireless network, or a mixture of these network types. Network 100 may include one or more transmission media 12 operable to transport one or more signals communicated by components of network 100. The components of network 100, coupled together by transmission media 12, may include a plurality of network elements 102. In the illustrated network 100, each network element 102 is coupled to four other nodes. However, any suitable configuration of any suitable number of network elements 102 may create network 10. Although network 100 is shown as a mesh network, network 100 may also be configured as a ring network, a point-to-point network, or any other suitable network or combination of networks. Network 100 may be used in a short-haul metropolitan network, a long-haul inter-city network, or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a T1 cable, a WiFi signal, a Bluetooth signal, or other suitable medium.

Network 100 may communicate information or "traffic" over transmission media 12. As used herein, "traffic" means information transmitted, stored, or sorted in network 100. Such traffic may comprise optical or electrical signals configured to encode audio, video, textual, and/or any other suitable data. The data may also be transmitted in a synchronous or asynchronous manner, and may be transmitted deterministically (also referred to as 'real-time') and/or stochastically. Traffic may be communicated via any suitable communications protocol, including, without limitation, the Open Systems Interconnection (OSI) standard and Internet Protocol (IP). Additionally, the traffic communicated via network 100 may be structured in any appropriate manner including, but not limited to, being structured in frames, packets, or an unstructured bit stream.

Each network element 102 in network 100 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

A component of network 100 and/or a network element 102 may include an interface, logic, memory, and/or other suitable element. An interface receives input, sends output, processes the input and/or output, and/or performs other suitable operations. An interface may comprise hardware and/or software.

Logic performs the operations of the component. For example, logic executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 100 without departing from the scope of the disclosure. The components and elements of network 100 described may be integrated or separated according to particular needs. Moreover, the operations of network 100 may be performed by more, fewer, or other components.

Figure 2:
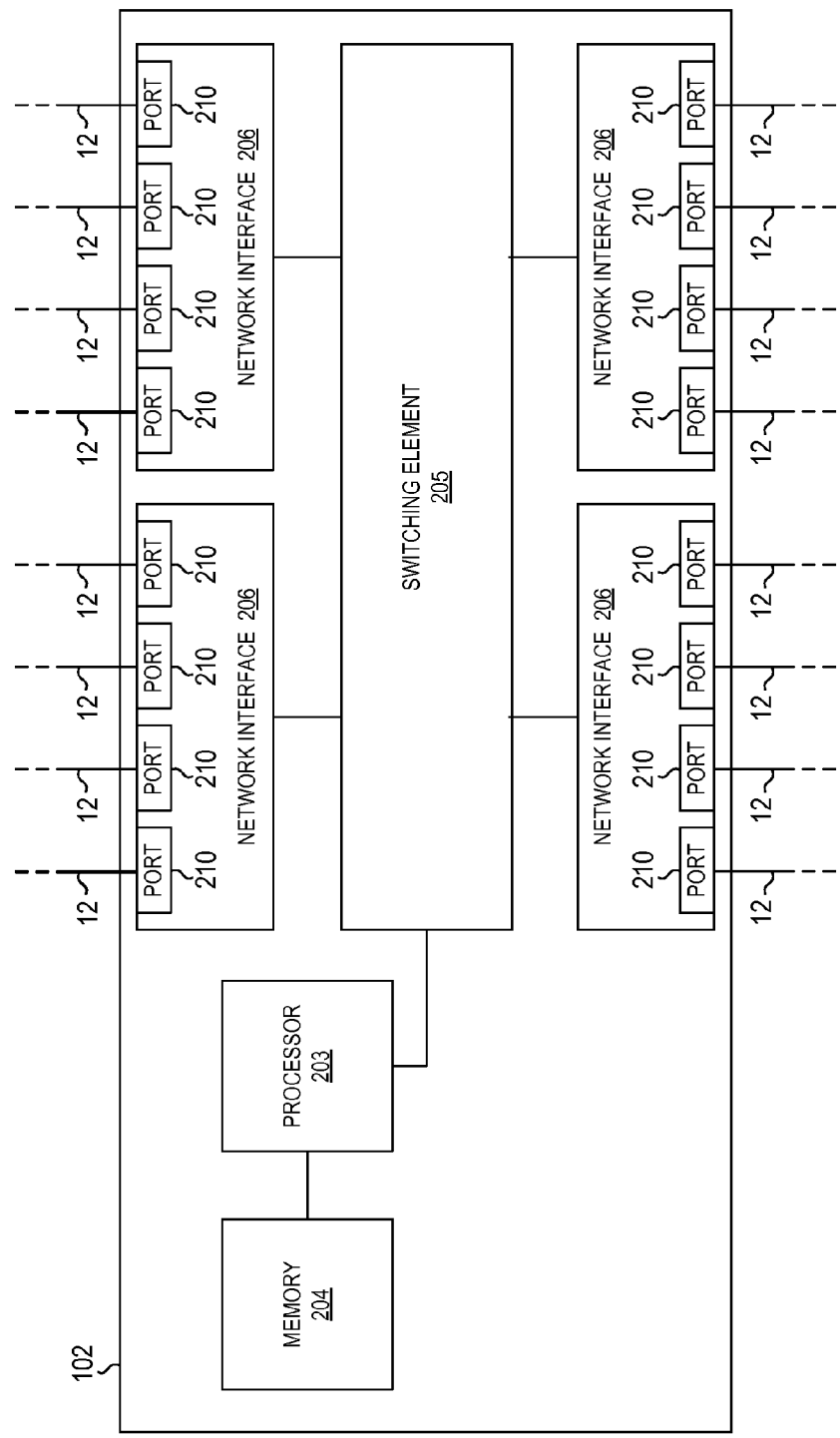
FIG. 2 illustrates a block diagram of selected elements of an example network element, in accordance with some embodiments of the present disclosure.

FIG. 2 illustrates a block diagram of selected elements of an example network element 102, in accordance with embodiments of the present disclosure. As discussed above, each network element 102 may be coupled to one or more other network elements 102 via one or more transmission media 12. In some embodiments, however, not all network elements 102 may be directly coupled as shown in FIG. 2. Each network element 102 may generally be configured to receive data from and/or transmit data to one or more other network elements 102. In certain embodiments, network element 102 may comprise a switch or router configured to transmit data received by network element 102 to another device (e.g., another network element 102) coupled to network element 102.

As depicted in FIG. 2, network element 102 may include a processor 203, a memory 204, a switching element 205, and one or more network interfaces 206 communicatively coupled to switching element 205.

Processor 203 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 203 may interpret and/or execute program instructions and/or process data stored in memory 205 and/or another component of network element 102. Although FIG. 2 depicts processor 203 as independent of other components of network element 102, in some embodiments one or more processors 203 may reside on network interfaces 206 and/or other components of network elements 102. In operation, processor 203 may process and/or interpret traffic received at a port 210. Accordingly, processor 203 may receive traffic from, or transmit traffic to ports 210 and network elements 206 via switching element 205.

Memory 204 may be communicatively coupled to processor 203 and may include any system, device, or apparatus configured to retain program instructions and/or data for a period of time (e.g., computer-readable media). Memory 204 may include random access memory (RAM), electrically erasable programmable read-only memory (EEPROM), a PCMCIA card, flash memory, magnetic storage, opto-magnetic storage, or any suitable selection and/or array of volatile or non-volatile memory that may retain data after power to network element 102 is turned off. Although FIG. 2 depicts memory 204 as independent of other components of network element 102, in some embodiments one or more memories 204 may reside on network interfaces 206 and/or other components of network element 102.

Switching element 205 may include any suitable system, apparatus, or device configured to receive traffic via a port 210 and forward such traffic to a particular network interface 206 and/or port 210 based on analyzing the contents of the datagrams carrying the traffic and/or based on a characteristic of a signal carrying the datagrams (e.g., a wavelength and/or modulation of the signal). For example, in certain embodiments, a switching element 205 may include a switch fabric (SWF).

Each network interface 206 may be communicatively coupled to switching element 205 and may include any suitable system, apparatus, or device configured to serve as an interface between a network element 102 and a transmission medium 12. Each network interface 206 may enable its associated network element 102 to communicate to other network elements 102 using any suitable transmission protocol and/or standard. Network interface 206 and its various components may be implemented using hardware, software, or any combination thereof. For example, in certain embodiments, one or more network interfaces 206 may include a network interface card. In the same or alternative embodiments, one or more network interfaces 206 may include a line card.

As depicted in FIG. 2, each of network interfaces 206 may include one or more physical ports 210. Each physical port 210 may include any system, device or apparatus configured to serve as a physical interface between a corresponding transmission medium 12 and network interface 206. For example, a physical port 210 may comprise an Ethernet port, a BNC connector, an optical port, or any other suitable port.

Figure 3:
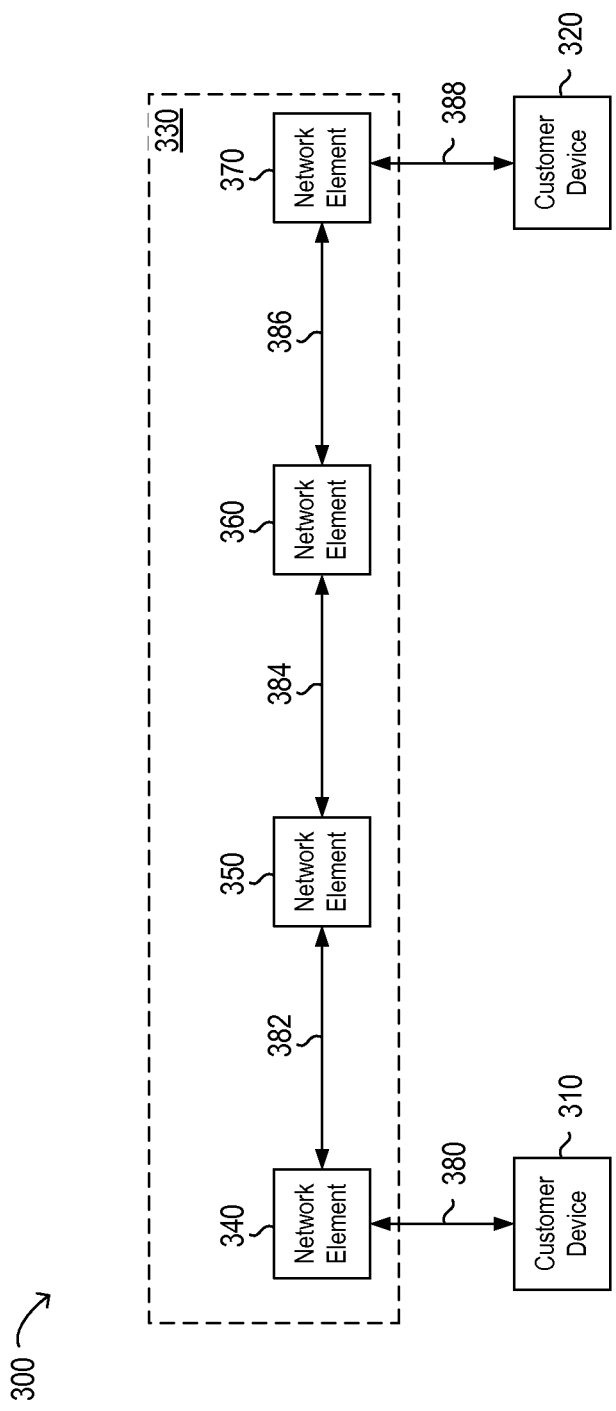
FIG. 3 illustrates a block diagram of selected elements of an example network, in accordance with some embodiments of the present disclosure.

FIG. 3 illustrates a block diagram of selected elements of an example network 300, in accordance with some embodiments of the present disclosure. Network 300 may be an instance of network 100 configured to tunnel management bytes from one customer device to another through a transport network. In some embodiments, network 300 may be an OTN network. Network 300 may include customer device 310 and customer device 320. In some embodiments, customer device 310 and customer device 320 each comprise a network element 102, discussed above in connection with FIGS. 1 and 2. For example, customer device 310 and customer device 320 may be OTN switches.

Network 300 may also include transport network 330. Transport network 330 may include one or more network elements. For example, in some embodiments, transport network 330 may include network element 340, network element 350, network element 360, and network element 370. In some embodiments, network elements 340-370 each comprise a network element 102, discussed above in connection with FIGS. 1 and 2. For example, network elements 340-370 may be OTN switches. Network elements 340-370 may be coupled by transmission media. For example transmission medium 382 may couple network element 340 and network element 350. Transmission medium 384 may couple network element 350 and network element 360. Transmission medium 386 may couple network element 360 and network element 370. In some embodiments, transport network 330 may be configured to convey customer data frames between customer device 310 and customer device 320.

In some embodiments, customer device 310 is coupled to transport network 330 by transmission medium 380. For example, transmission medium 380 may couple customer device 310 and network element 340. In some embodiments customer device 320 is coupled to transport network 330 by transmission medium 388. For example, transmission medium 388 may couple customer device 320 and network element 370. In some embodiments, transport network 330 is operated by a different operator than customer devices 310 and 320. For example, transport network 330 may be operated by a company providing network transportation services to a customer that operates customer devices 310 and 320.

Transmission media 380-388 may include any system, device, or apparatus configured to communicatively couple network devices to each other and communicate information between corresponding network devices. Transmission media 380-388 may include an optical fiber, an Ethernet cable, a T1 cable, a WiFi signal, a Bluetooth signal, or other suitable medium.

In the illustrated network 300, network elements 320-370 are coupled in a linear configuration. However, any suitable configuration of any suitable number of network elements may create network 300 or transport network 330. Although transport network 330 is shown as a linear network, transport network 330 may also be configured as a ring network, a point-to-point network, or any other suitable network or combination of networks. Transport network 330 may be used in a short-haul metropolitan network, a long-haul inter-city network, or any other suitable network or combination of networks.

As discussed above, in some embodiments, transport network 330 is operated by a different operator than customer devices 310 and 320. For example, transport network 330 may be operated by a company providing network transportation services, while customer devices 310 and 320 are operated by a customer of that company. As a result, management information relevant to customer devices 310 and 320 may not be relevant to network elements within transport network 330. For example, the customer may wish to send management information, for example remote-management commands or data, from customer device 310 to customer device 320 using the GCC0 channel defined in ITU-T G.709. However, under ITU-T G.709, GCC0 bytes must be terminated and regenerated at each hop in the network. As a result, network element 340 may terminate GCC0 bytes sent from customer device 310. In some embodiments, however, network element 340 may be configured to tunnel the GCC0 bytes through transport network 330 and deliver them to customer device 320, as described below.

Figure 4:
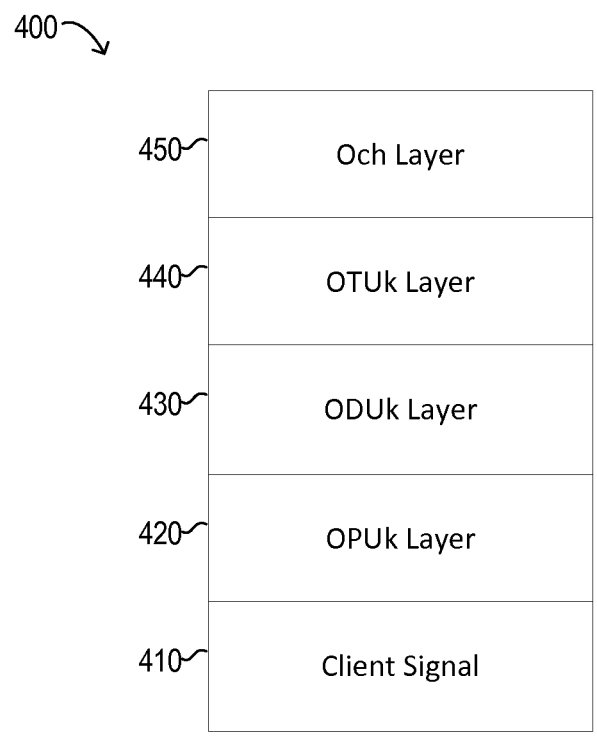
FIG. 4 illustrates a diagram of selected elements of an example protocol stack, in accordance with some embodiments of the present disclosure.

FIG. 4 illustrates a diagram of selected elements of an example protocol stack 400, in accordance with some embodiments of the present disclosure. For example, in some embodiments protocol stack 400 may be the OTN hierarchy defined in ITU-T G.709.

Client signal layer 410 may represent data being transmitted between devices on a customer's network. For example, client signal layer 410 may include a SONET/SDH signal containing customer data.

Optical Channel Payload Unit (OPU) layer 420 encapsulates client signal layer 410 and may perform rate justification if needed. OPU layer 420 may operate at any one of a number of predefined speeds identified by an index k. For example, an OPU1 signal may transport approximately 2,488,320 kilobits per second (kbit/s). An OPU2 signal may transport approximately 238/237×9,953,280 kbit/s. An OPU3 signal may transport approximately 238/236×39,813,120 kbit/s. As a result, an OPU signal within index k may be used to transport multiple OPU signals with indexes lower than k. For example, an OPU3 signal may transport four OPU2 signals, and an OPU2 signal may transport four OPU1 signals. The index k of an OPU signal may be referred to as the "order" of the OPU signal. For example, an OPU3 signal may be referred to as a "higher-order" OPU signal than an OPU2 signal. Data frames transmitted by these signals, discussed below with reference to FIGS. 5 and 6, may also be identified by the index k. For example, a data frame transmitted by an ODU2 signal may be referred to as an "ODU2 data frame." OPU layer 420 may also set overhead bytes within the signal. For example, OPU layer 420 may set overhead bytes indicating the type of client signal encapsulated by OPU layer 420.

Optical Channel Data Unit (ODU) layer 430 encapsulates OPU layer 410. ODU layer 430 may set overhead bytes within the signal. For example, ODU layer 430 may set overhead bytes indicating the source access point and the destination access point for the data.

Optical Channel Transport Unit (OTU) layer 440 encapsulates ODU layer 430. OTU layer 440 may add Forward Error Correction (FEC) information and set other overhead bytes within the signal. For example, OTU FEC information may include Reed-Solomon RS (255,239) error correction codes as specified in ITU-T G.709. As another example, OTU layer 440 may set frame alignment bits and set GCC0 bytes to contain management information.

Optical Channel (OCh) layer 450 may encapsulate OTU layer 440. OCh layer 450 may convert the signal to the optical domain and transmit it across an optical fiber.

Figure 5:
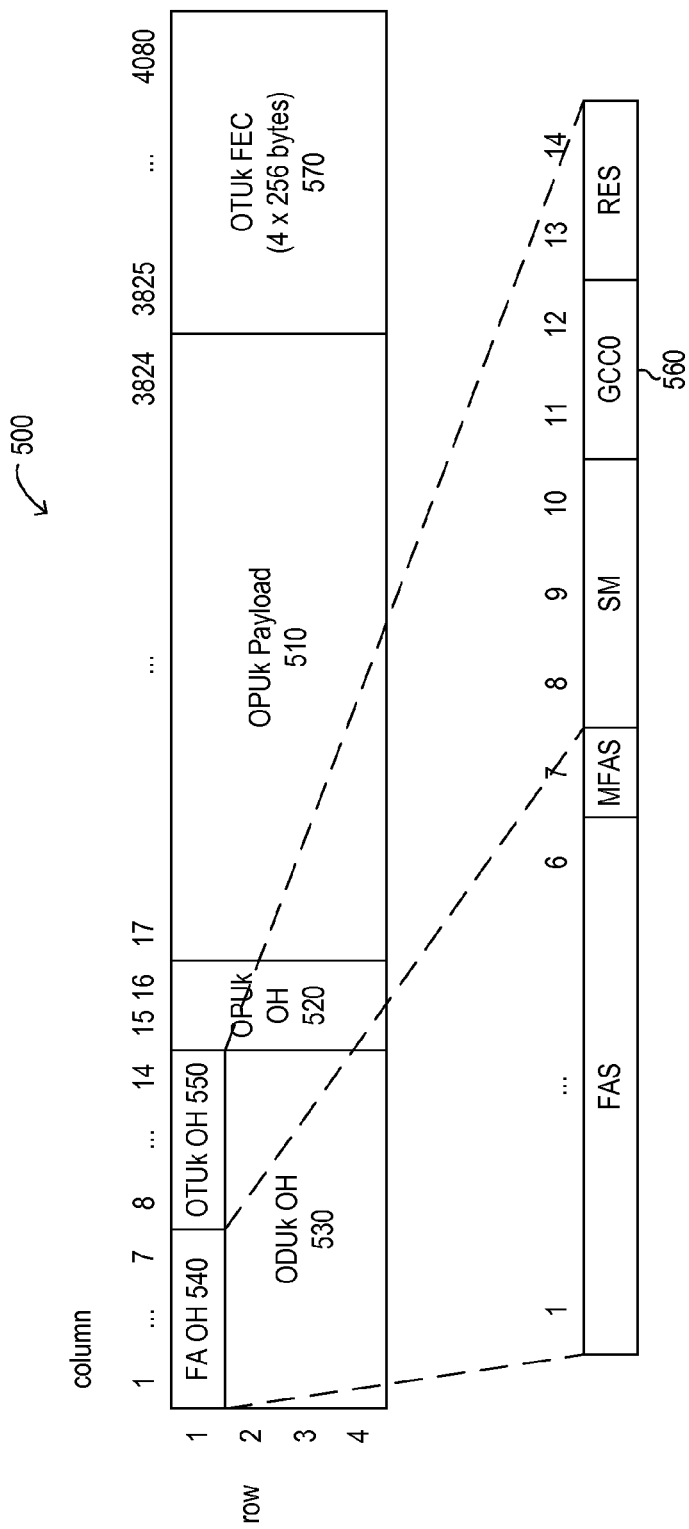
FIG. 5 illustrates a diagram of selected elements of an example data frame, in accordance with some embodiments of the present disclosure.

FIG. 5 illustrates a diagram of selected elements of an example data frame 500, in accordance with some embodiments of the present disclosure. For example, data frame 500 may represent an OTU data frame as transmitted by OTU layer 440, discussed with reference to FIG. 4. Data frame 500 may be identified by an index k, corresponding to the index k of the OTU signal used to transmit the frame. Data frame 500 may include four rows each consisting of 4080 bytes. Data frame 500 may include a payload section and an overhead section. For example, the payload section of data frame 500 may include OPU payload 510. OPU payload 510 may include bytes 17 to 3824 of each of the four rows. In some embodiments, OPU payload 510 may be used to carry an SONET/SDH signal containing customer data. In some embodiments, OPU payload 510 may be used to carry multiple lower-order signals. For example, in embodiments where data frame 500 is an OTU3 data frame, OPU payload 510 may be used to carry multiple OTU2 data frames. In such embodiments, OPU payload 510 may contain multiple extended ODU2 (ODTU2) data frames, discussed below with reference to FIG. 6, each of which corresponds to one of the OTU2 data frames carried by the OTU3 data frame. Such lower-order data frames may be interleaved within one or more higher-order data frames according to ITU-T G.709. The overhead section of data frame 500 may include OPU overhead 520, ODU overhead 530, Frame alignment overhead 540, and OTU overhead 550. OPU overhead 520 may include bytes 15 to 16 of each of the four rows. OPU layer 420, discussed with reference to FIG. 4, may set one or more bits within OPU overhead 520. ODU overhead 530 may include bytes 1 to 14 of each of rows 2, 3, and 4. ODU layer 430, discussed with reference to FIG. 4, may set one or more bits within ODU overhead 530. Frame alignment overhead 540 may include bytes 1 to 7 of row 1. OTU overhead 550 may include bytes 8 to 14 of row 1. In particular, OTU overhead 550 may include GCC0 bytes 560 as bytes 11 and 12 of row 1. OTU layer 440, discussed with reference to FIG. 4, may set GCC0 bytes 560 to contain management information.

Figure 6:
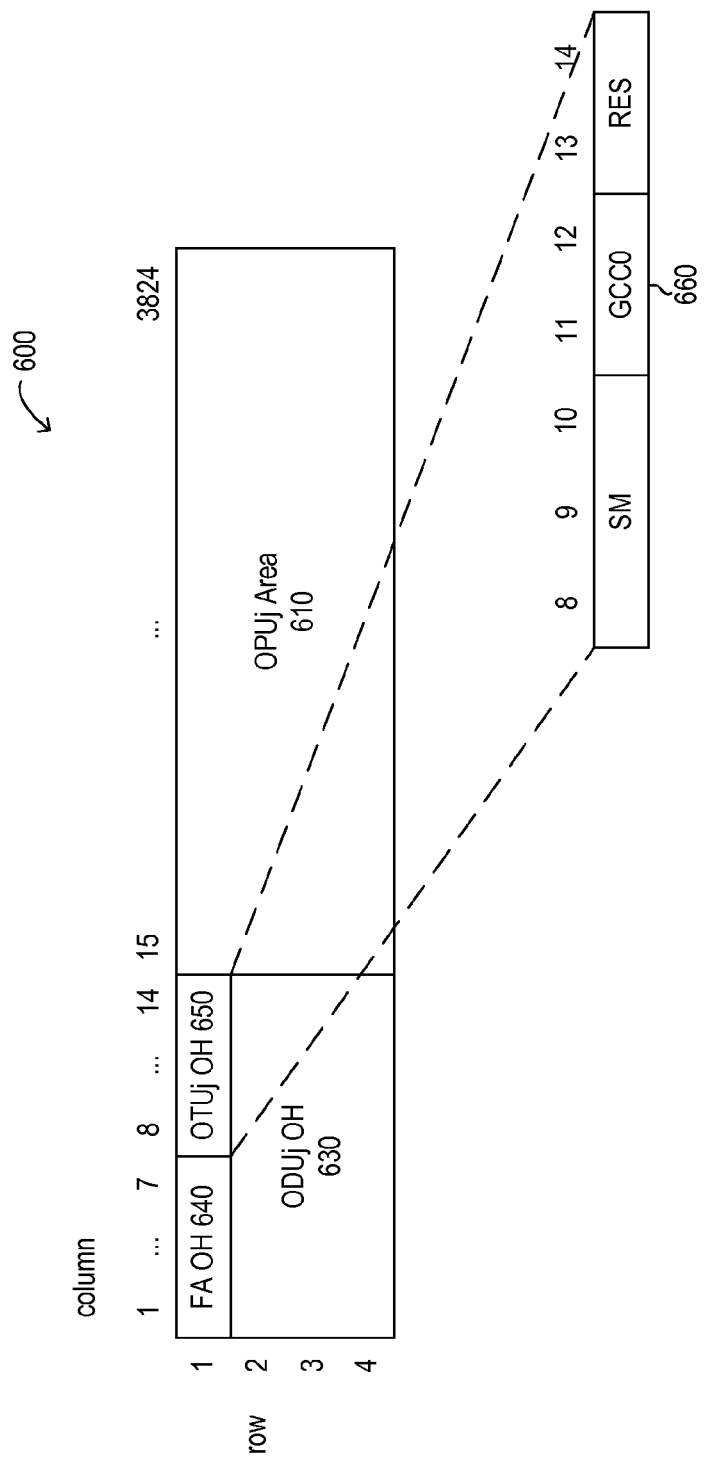
FIG. 6 illustrates a diagram of selected elements of an example extended data frame, in accordance with some embodiments of the present disclosure.

FIG. 6 illustrates a diagram of selected elements of an example extended data frame 600, in accordance with some embodiments of the present disclosure. Extended data frame 600 may have approximately the same size and layout as a portion of data frame 500. For example, extended data frame 600 may represent an extended ODU data frame, also referred to as an "ODTU frame" in the ITU-T G.709 standard, as transmitted by ODU layer 430, discussed with reference to FIG. 4. Extended data frame 600 may be identified by an index j, corresponding to the index k of the OTU signal used to transmit the frame. Extended data frame 600 may include four rows each consisting of 3824 bytes. Extended data frame 600 may include a payload section and an overhead section. For example, the payload section of extended data frame 600 may include OPU area 610. OPU area 610 may include bytes 15 to 3824 of each of the four rows. OPU area 610 may be used to carry an SONET/SDH signal containing customer data, OPU overhead 520, discussed with reference to FIG. 5, or other appropriate payload data. In some embodiments, OPU area 610 may be used to carry multiple lower-order data frames. For example, in an extended ODU3 (ODTU3) data frame, OPU area 610 may be used to carry multiple ODU2 data frames. The overhead section of extended data frame 600 may include ODU overhead 630, frame alignment overhead 640, and OUT overhead 650. ODU overhead 630 may include bytes 1 to 14 of each of rows 2, 3, and 4. Frame alignment overhead 640 may include bytes 1 to 7 of row 1. OTU overhead 650 may include bytes 8 to 14 of row 1. In particular, OTU overhead 650 may include GCC0 bytes 660 as bytes 11 and 12 of row 1.

Figure 7:
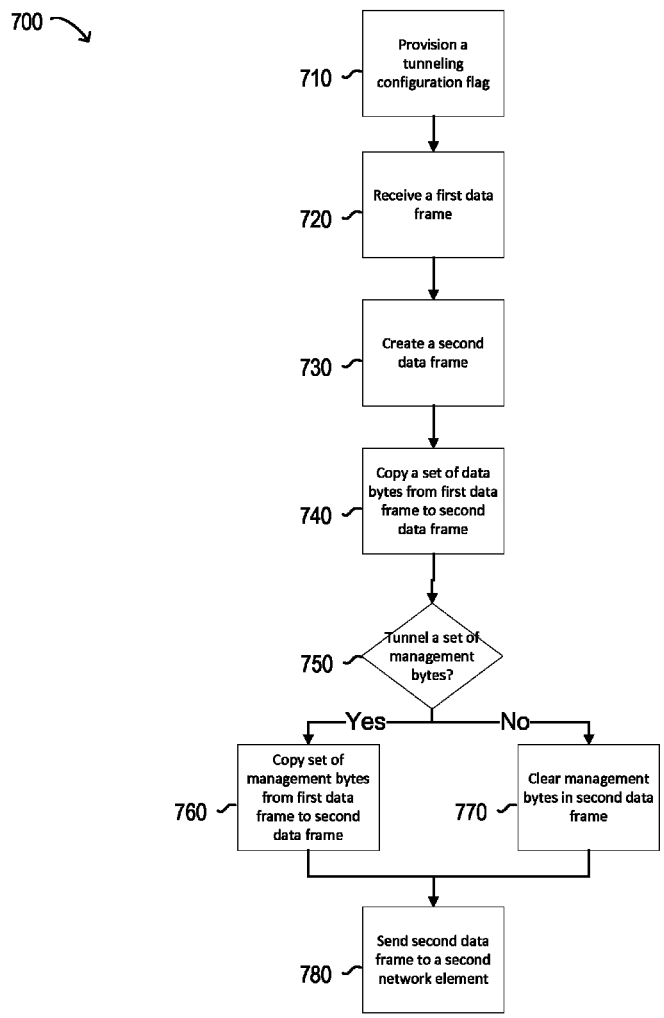
FIG. 7 illustrates a flow chart of selected elements of a method for tunneling a set of management bytes over a transport network, in accordance with some embodiments of the present disclosure.

FIG. 7 illustrates a flow chart of selected elements of a method 700 for tunneling a set of management bytes over a transport network, in accordance with some embodiments of the present disclosure. For illustrative purposes, method 700 is described with respect to network 300, discussed with reference to FIG. 3; however, method 700 may be used to tunnel a set of management bytes over any appropriate transport network. The steps of method 700 can be performed by electronic or optical circuits, various computer programs, models, or any combination thereof, configured tunnel a set of management bytes over transport network. The programs and models may include instructions stored on a non-transitory computer-readable medium and operable to perform, when executed, one or more of the steps described below. The computer-readable media can include any system, apparatus, or device configured to store and retrieve programs or instructions such as a hard disk drive, a compact disc, flash memory, or any other suitable device. The programs and models may be configured to direct a processor or other suitable unit to retrieve and execute the instructions from the computer readable media. Collectively, the circuits, or computer programs and models used to tunnel a set of management bytes may be referred to as a "processing tool." For example, the processing tool may be network element 340, discussed with reference to FIG. 3.

In step 710, the processing tool provisions a tunneling configuration flag. In some embodiments, the processing tool may set a global flag that indicates whether the processing tool should tunnel all management bytes. For example, the processing tool may set a global flag to "true" to indicate that all management bytes received by the processing tool should be tunneled, or to "false" to indicate that no management bytes received by the processing tool should be tunneled. In some embodiments, the processing tool may set a separate flag for each network interface or for each customer. For example, the processing tool may set one flag to indicate that all management bytes contained within data frames received on one network interface should be tunneled, but set a second flag to indicate that management bytes contained within data frames on a second network interface should not be tunneled. In some embodiments, the flag is associated with data frames received from a particular customer device. For example, the processing tool may set a flag to indicate that GCC0 bytes 560, discussed with reference to FIG. 5, contained within OTU data frames received from customer device 310, discussed with reference to FIG. 3, should be tunneled.

In step 720, the processing tool receives a first data frame. In some embodiments, the first data frame may be a frame in an OTN hierarchy. For example, the processing tool may receive OTU data frame 500, discussed with reference to FIG. 5. For example, the first data frame may be an OTU2 data frame. The first data frame may contain a set of management bytes. For example, the first data frame may contain GCC0 bytes 560, discussed with reference to FIG. 5. The first data frame may also contain a set of data bytes. For example, the first data frame may contain OPU payload 510, discussed with reference to FIG. 5. In some embodiments, the first data frame may contain additional information. For example, the first data frame may contain frame alignment overhead 540, ODU overhead 530, OPU overhead 520, or other appropriate data. Although this disclosure discusses specific examples of the first data frame and its contents, any suitable first data frame containing management bytes and data bytes is intended to be encompassed by this disclosure.

In step 730, the processing tool creates a second data frame for transmission. In some embodiments, the second data frame may be a frame in an OTN hierarchy. For example, the second data frame may be an OTU data frame. In some embodiments, the second data frame may contain extended data frame 600, discussed with reference to FIG. 6. In some embodiments, the second data frame may be a higher-order data frame than the first data frame. For example, in embodiments in which the first data frame is an OTU2 data frame, the second data frame may be an OTU3 data frame containing multiple extended ODU2 (ODTU2) data frames. In some embodiments, the second data frame includes management bytes and data bytes. For example, in embodiments in which the second data frame is an OTU2 data frame, the second data frame may contain GCC0 bytes 560 and OPU payload 510, discussed with reference to FIG. 5. Although this disclosure discusses specific examples of the second data frame and its contents, any suitable second data frame containing management bytes and data bytes is intended to be encompassed by this disclosure.

In step 740, the processing tool copies the set of data bytes from the first data frame to the second data frame. For example, in embodiments in which the first data frame is an OTU2 frame and the second data frame is an OTU frame containing an extended ODU (ODTU) frame, the processing tool may copy OPU payload 510, discussed with reference to FIG. 5, within the first data frame, to the OPU payload 610, discussed with reference to FIG. 6, within the second data frame. In embodiments in which the first data frame is an OTU2 frame and the second data frame is a higher-order OTN frame, for example an OTU3 frame, the processing tool may identify an extended ODU2 (ODTU2) frame located in OPU payload 510 of the second data frame. The processing tool may then copy OPU payload 510 within the first data frame, to OPU payload 610 within the identified ODTU2 frame within OPU payload 510 of the second data frame. In addition, the processing tool may copy other data from the first data frame to the second data frame. For example, the processing tool may copy OPU overhead 520, ODU overhead 530, or frame alignment overhead 540 from the first data frame to an appropriate location within the second data frame.

In step 750, the processing tool determines whether the set of management bytes within the first data frame should be tunneled. In some embodiments, the processing tool may tunnel all management bytes. In some embodiments, the processing tool may tunnel management bytes in some data frames but not others. For example, the processing tool may determine which network interface received the first data frame, and check the tunneling configuration flag set in step 710. If the configuration flag is set to "true," the processing tool may determine that the management bytes should be tunneled. If the configuration flag is set to "false," the processing tool may determine that the management bytes should not be tunneled. If the processing tool determines that the management bytes should be tunneled, the processing tool proceeds to step 760. If the processing tool determines that the management bytes should not be tunneled, the processing tool proceeds to step 770.

In step 760, in response to determining that the management bytes should be tunneled, the processing tool copies the set of management bytes from the first data frame into the second data frame. For example, in embodiments in which the first data frame is an OTU2 frame and the second data frame is an OTU frame containing an extended ODU (ODTU) frame, the processing tool may copy GCC0 bytes 560, discussed with reference to FIG. 5, within the first data frame, to the GCC0 bytes 660, discussed with reference to FIG. 6, within the second data frame. In embodiments in which the first data frame is an OTU2 frame and the second data frame is a higher-order OTN frame, for example an OTU3 frame, the processing tool may identify the extended ODU2 (ODTU2) frame (located in OPU payload 510 of the second data frame) that contains the data copied from the first data frame in step 740. The processing tool may then copy GCC0 bytes 560, discussed with reference to FIG. 5, within the first data frame, to the GCC0 bytes 660 within the identified ODTU2 frame within OPU payload 510 of the second data frame. The processing tool then proceeds to step 780.

In step 770, in response to determining that the management bytes should not be tunneled, the processing tool clears the management bytes in the second data frame. For example, in embodiments in which the second data frame is an OTU2 frame, the processing tool may set GCC0 bytes 560, discussed with reference to FIG. 5, to zero. In embodiments in which the second data frame is an OTU frame containing extended ODU (ODTU) frame, the processing tool may set GCC0 bytes 660, discussed with reference to FIG. 6, to zero. In embodiments in which the first data frame is an OTU2 frame and the second data frame is a higher-order OTN frame, for example an OTU3 frame, the processing tool may identify the extended ODU2 (ODTU2) frame (located in OPU payload 510 of the second data frame) that contains the data copied from the first data frame in step 740. The processing tool may then set the GCC0 bytes 660 within the identified ODTU2 frame within OPU payload 510 of the second data frame to zero. The processing tool then proceeds to step 780.

In step 780, the processing tool sends the second data frame to a second network element. In some embodiments, the processing tool may send the second data frame directly to the second network element over a transmission medium. For example, network element 340, discussed with reference to FIG. 3, may send the second frame directly to network element 350 over transmission medium 382. In some embodiments, the processing tool may send the second data frame to a third network element which forwards the second data frame to the second network element. For example, in the example network illustrated in FIG. 3, network element 340 may send the second frame to network element 350, which forwards it to network element 360. In some embodiments, a larger number of hops may be used. In addition, in some embodiments, the second data frame may be carried within a higher-order data frame for some hops. As an illustrative example, network element 340, discussed with reference to FIG. 3, may send an OTU2 frame containing an extended ODU2 (ODTU2) data frame (the second data frame) to network element 350 over transmission medium 382. Network element 350 may, in turn, encapsulate the ODTU2 data frame within an OTU3 data frame, which it sends to network element 360 over transmission medium 384. Network element 360 may unpack the OTU3 data frame and send the ODTU2 data frame to network element 370 over transmission medium 370. Although this disclosure discusses particular networks and data frames, any appropriate network and data frame may be used.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving, at a first network element, a first data frame comprising a set of management bytes and a set of data bytes;
   determining whether the set of management bytes should be tunneled;
   in response to determining that the set of management bytes should be tunneled,
      copying the set of data bytes into a payload section of a second data frame;
      copying the set of management bytes into the first row of multiple rows of an overhead section of the second data frame; and
      sending, to a second network element, the second data frame comprising the set of management bytes and the set of data bytes.

2. The method of claim 1, wherein the first data frame comprises an OTU frame.

3. The method of claim 2,
   wherein the second data frame comprises an extended ODU frame.

4. The method of claim 2,
   wherein the second data frame comprises an ODU frame.

5. The method of claim 4, wherein sending the second data frame to the second network element comprises sending the second data frame to a third network element for forwarding to the second network element.

6. The method of claim 1, further comprising:
   provisioning a flag at the first network element, wherein determining whether the set of management bytes should be tunneled includes determining whether the flag is set.

7. A network element comprising:
   a processor;
   a memory communicatively coupled to the processor;
   instructions stored in the memory that, when executed by the processor, cause the processor to:
      receive a first data frame comprising a set of management bytes and a set of data bytes;
      determine whether the set of management bytes should be tunneled;
      in response to determining that the set of management bytes should be tunneled,
         copy the set of data bytes into a payload section of a second data frame;
         copy the set of management bytes into the first row of multiple rows of an overhead section of the second data frame; and
         send, to a second network element, the second data frame comprising the set of management bytes and the set of data bytes.

8. The network element of claim 7, wherein the first data frame comprises an OTU frame.

9. The network element of claim 8,
   wherein the second data frame comprises an extended ODU frame.

10. The network element of claim 8,
    wherein the second data frame comprises an ODU frame.

11. The network element of claim 10, wherein sending the second data frame to the second network element comprises sending the second data frame to a third network element for forwarding to the second network element.

12. The network element of claim 7, the instructions, when executed by the processor, further causing the processor to:
    provision a flag at the first network element, wherein determining whether the set of management bytes should be tunneled includes determining whether the flag is set.

13. The network element of claim 7, the instructions, when executed by the processor, further causing the processor to:
    in response to determining that the management bytes should not be tunneled, send to the second network element a third data frame comprising the set of data bytes but not the set of management bytes.

14. A non-transient computer readable medium comprising instructions that, when executed by a processor, cause the processor to:
    receive a first data frame comprising a set of management bytes and a set of data bytes;
    determine whether the set of management bytes should be tunneled;
    in response to determining that the set of management bytes should be tunneled,
    copy the set of data bytes into a payload section of a second data frame;
    copy the set of management bytes into the first row of multiple rows of an overhead section of the second data frame; and
    send, to a second network element, the second data frame comprising the set of management bytes and the set of data bytes.

15. The non-transient computer readable medium of claim 14, wherein the first data frame comprises an OTU frame.

16. The non-transient computer readable medium of claim 15,
    wherein the second data frame comprises an extended ODU frame.

17. The non-transient computer readable medium of claim 15,
    wherein the second data frame comprises an ODU frame.

18. The non-transient computer readable medium of claim 17, wherein sending the second data frame to the second network element comprises sending the second data frame to a third network element for forwarding to the second network element.

19. The non-transient computer readable medium of claim 14, the instructions, when executed by the processor, further causing the processor to:
provision a flag at the first network element, wherein determining whether the set of management bytes should be tunneled includes determining whether the flag is set.

20. The non-transient computer readable medium of claim 14, the instructions, when executed by the processor, further causing the processor to:
in response to determining that the management bytes should not be tunneled, send to the second network element a third data frame comprising the set of data bytes but not the set of management bytes.

* * * * *